(12) United States Patent
van Waes et al.

(10) Patent No.: US 7,813,458 B2
(45) Date of Patent: Oct. 12, 2010

(54) SYSTEM AND METHOD FOR PRECODING IN A MULTIPLE-INPUT MULTIPLE-OUTPUT (MIMO) SYSTEM

(75) Inventors: Nico van Waes, Keller, TX (US); Hua Zhang, Jiangsu (CN); Juha Heiskala, Helsinki (FI); Victor Stolpman, Dallas, TX (US); Jian Zhong Zhang, Irving, TX (US); Tony Reid, Plano, TX (US); Jae Son, Irving, TX (US)

(73) Assignee: Nokia Corporation, Espoo (FI)

( * ) Notice: Subject to any disclaimer, the term of this patent is extended or adjusted under 35 U.S.C. 154(b) by 480 days.

(21) Appl. No.: 11/573,940

(22) PCT Filed: Aug. 19, 2005

(86) PCT No.: PCT/IB2005/002458

§ 371 (c)(1),
(2), (4) Date: Jul. 31, 2007

(87) PCT Pub. No.: WO2006/018710

PCT Pub. Date: Feb. 23, 2006

(65) Prior Publication Data

US 2007/0280386 A1    Dec. 6, 2007

(51) Int. Cl.
*H04B 7/10*    (2006.01)
(52) U.S. Cl. .............. 375/347; 375/299; 455/101; 455/132; 455/296; 455/500
(58) Field of Classification Search .......... 375/299, 375/340, 347; 455/101, 132, 296, 500
See application file for complete search history.

(56) References Cited

U.S. PATENT DOCUMENTS

2005/0286663 A1* 12/2005 Poon .................... 375/347

OTHER PUBLICATIONS

David J. Love et al "Limited Feedback Precoding for Spatial Multiplexing Systems Using Linear Receivers" IEEE 2003.*
Shahab Sanayei, David J. Love, Aria Nosratinia; *On the Design of Linear Precoders for Orthogonal Space-Time Block Codes with Limited Feedback;* 2005 IEEE Wireless Communications and Networking Conference, New Orleans, Louisiana; Mar. 2005; pp. 489-493; vol. 1; ISBN 0-7803-8966-2; USA.

(Continued)

*Primary Examiner*—David C Payne
*Assistant Examiner*—Leon Flores
(74) *Attorney, Agent, or Firm*—Alston & Bird LLP

(57) ABSTRACT

A network entity in a multi-transmit antenna system, such as a transmitting or receiving entity, includes a component such as a pre-coder or a receiver, and is configured for full-spatial-rate coding data. The network entity is capable of providing a full-spatial-rate codebook having been designed by selecting an underlying partial-spatial-rate codebook designed for a system configured for partial-spatial-rate coding data. The full-spatial-rate codebook can then be designed in a manner including defining the full-spatial-rate codewords based upon partial-spatial-rate codewords of the partial-spatial rate codebook and basis vectors of a null space of the respective partial-spatial-rate codewords in a multidimensional vector space. The network entity can also be capable of selecting codewords of the codebook in accordance with a sub-space tracking method whereby the codewords of the codebook can be selected in a manner that exploits correlations therebetween.

60 Claims, 3 Drawing Sheets

OTHER PUBLICATIONS

David J. Love, Robert W. Heath, Jr.; *Limited Feedback Precoding for Orthogonal Space-Time Block Codes;* Global Telecommunications Conference Piscataway, New Jersey, Dec. 2004; pp. 561-565; vol. 1; IEEE; USA.

David J. Love, Robert W. Heath, Jr;*Limited Feedback Precoding for Spatial Multiplexing Systems;* IEEE Global Telecommunications Conference Proceedings, San Francisco; Dec. 2003; pp. 1857-1861; vol. 7; IEEE; ISBN 0-7803-7974-8.

Ching-Shyan Maa, Yeong-Cheng Wang, Jiunn-Tsair Chen; *Low-Complexity Channel-Adapted Space-Time Coding Schemes for Frequency-Selective Wireless MIMO Channels;* IEEE 58$^{th}$ Vehicular Technology Conference, Orlando, Florida; Oct. 2003; pp. 518-522; vol. 1; ISBN 0-7803-7954-3.

Avi Steiner, Michael Peleg, Shlomo Shamai (Shitz);*SVD Iterative Detection of Turbo-Coded Multiantenna Unitary Differential Modulation;* IEEE Transactions on Communications; Mar. 2003; pp. 441-444; vol. 51, No. 3; ISSN 0090-6778.

\* cited by examiner

SYSTEM AND METHOD FOR PRECODING IN A MULTIPLE-INPUT MULTIPLE-OUTPUT (MIMO) SYSTEM

FIELD

The present invention generally relates to multiple-input multiple-output (MIMO) systems and methods for effectuating wireless communication, and more particularly relates to MIMO systems and methods for preceding signals to provide diversity gain in effectuating wireless communication.

BACKGROUND

As wireless communication systems evolve, wireless system design has become increasingly demanding in relation to equipment and performance requirements. Future wireless systems, which will be third generation (3G) and fourth generation (4G) systems compared to the first generation (1G) analog and second generation (2G) digital systems currently in use, will be required to provide high quality high transmission rate data services in addition to high quality voice services. Concurrent with the system service performance requirements will be equipment design constraints, which will strongly impact the design of mobile terminals. The 3G and 4G wireless mobile terminals will be required to be smaller, lighter, more power-efficient units that are also capable of providing the sophisticated voice and data services required of these future wireless systems.

Time-varying multi-path fading is an effect in wireless systems whereby a transmitted signal propagates along multiple paths to a receiver causing fading of the received signal due to the constructive and destructive summing of the signals at the receiver. Several methods are known for overcoming the effects of multi-path fading, such as time interleaving with error correction coding, implementing frequency diversity by utilizing spread spectrum techniques, or transmitter power control techniques. Each of these techniques, however, has drawbacks in regard to use for 3G and 4G wireless systems. Time interleaving may introduce unnecessary delay, spread spectrum techniques may require large bandwidth allocation to overcome a large coherence bandwidth, and power control techniques may require higher transmitter power than is desirable for sophisticated receiver-to-transmitter feedback techniques that increase mobile terminal complexity. All of these drawbacks have negative impact on achieving the desired characteristics for third and fourth generation mobile terminals.

Antenna diversity is another technique for overcoming the effects of multi-path fading in wireless systems. In transmit diversity, a signal is multiplexed and processed to generate a number of separate signals that are then transmitted via two or more physically separated antennas. Similarly, in reception diversity, two or more physically separated antennas are used to receive a signal, which is then processed through combining and switching to generate a received signal. Various systems, known as multiple-input multiple-output (MIMO) systems, employ both transmit diversity and reception diversity, and provide multiplexing and diversity gains in wireless communication.

For narrow band MIMO channels, the diversity gain can be achieved via space-time coding and/or feeding back, to the transmitter, channel state information for use in preceding signals transmitted via the transmit antennas. Exploiting the channel state information at the transmitter can not only achieve diversity gain but also array gain. Typically, such a precoding technique requires the transmitter to have or otherwise acquire accurate channel state information. In many practical implementations, however, the transmitter cannot obtain very accurate channel state information. Thus, techniques have been developed whereby the receiver provides channel state information to the transmitter. In many cases, such as frequency division multiplexed (FDM) systems, there is no reciprocity between forward and reverse channels. Accordingly, a feedback channel with a limited transmission rate is typically provided between the transmitter and receiver so that the receiver can provide the transmitter with the channel state information.

In one precoding technique using channel state information to achieve diversity gain and array gain, the transmitter and receiver share a codebook that includes a number of codewords comprising matrices. In this regard, the matrices can each represent a different possible quantization of the MIMO channel, such as for a partial-spatial-rate case where the number of spatially multiplexed data streams to be transmitted is less than the number of transmit antennas. In various instances, the codebook is a set of subspaces rather than a set of matrixes, and as such, the codebook construction can be considered equivalent to subspace packing in a collection of vector subspaces of a vector space, such as a Grassmann manifold. In operation, the receiver quantizes the MIMO channel across which the transmitter and receiver are communicating, and locates the closest matching codeword. Advantageously, and limiting the number of bits of feedback to the transmitter, the receiver then conveys the codebook index of that codeword to the transmitter. Accordingly, the transmitter can use the index and its codebook to similarly locate the respective codeword, and then weight signals based upon the codeword for transmission to the receiver via the transmit antennas.

There are a number of different criteria that the receiver can use to locate the closest matching matrix including, for example, MSE (mean square error), capacity, minimum distance and the like. Typically, the receiver must perform an exhaustive search of the codebook for different criteria. As the size of the codebook increases, however, the computation complexity of locating the desired matrix also undesirably increases. It would therefore be desirable to design a system and method for reducing the computational complexity of locating a desired codeword.

Further, as codebooks are typically designed for the partial-spatial-rate case, it would also be desirable for the system and method to be configured for the full-spatial-rate case where the number of spatially multiplexed data streams to be transmitted equals the number of transmit antennas. Such a configuration would desirably operate without increasing (or significantly increasing) the number of feedback bits required to notify the transmitter of a desired codeword. In this regard, the partial-rate case is typically applicable for cases where the transmitter and receiver are communicating with a low to medium signal-to-noise ratio (SNR), typically far away from one another. If the transmitter and receiver are communicating with a high SNR, however, it is typically desirable to fully capitalize on the higher quality channel to maximize the throughput on the channel by increasing the number of spatially multiplexed data streams to equal the number of transmit antennas.

SUMMARY

In light of the foregoing background, exemplary embodiments of the present invention provide an improved network entity, method and computer program product for preceding data in a multiple-input multiple-output (MIMO) system. In accordance with exemplary embodiments of the present invention, a method of precoding data includes designing the codebook, which can be made known or otherwise be provided to both a transmitting entity and a receiving entity of the system. In this regard, a partial-spatial-rate codebook can be designed for partial-spatial-rate coding of the system whereby the transmitting entity of the system includes more transmit antennas T than spatial streams N over which data is coded (i.e., T>N). For full-spatial-rate coding whereby the number of transmit antennas equals the number of spatial streams (i.e., T=N), then, a full-spatial-rate codebook can be designed by "completing" an underlying partial-spatial-rate codebook based upon basis vectors of the null space of the underlying partial-spatial-rate codebook. By designing the full-spatial-rate codebook based upon the basis vectors of the null space of a selected underlying partial-spatial-rate codebook, the number of bits required to feedback a selected codeword in the full-spatial-rate case may remain the same as feeding back a corresponding codeword in the partial-spatial-rate case of the underlying codebook. Thus, the full-spatial-rate case may be implemented without requiring additional feedback bits over those required in the partial-spatial-rate case.

After the codebook is designed and made known to the transmitting and receiving entities, the receiving entity can select codewords from the codebook and indicate the selected codeword to the transmitting entity for use in pre-coding data transmitted therefrom. In accordance with exemplary embodiments of the present invention, the codewords can be selected according to a sub-space tracking method. In such a sub-space tracking method, a first codeword for a first carrier can be selected from the codebook. A second codeword for a second, subsequent carrier (in the time or frequency domain) can then be selected from a subset of the codebook. In this regard, the codewords in the codebook can be found in a collection of vector subspaces, such as a Grassmann manifold. Accordingly, the subset of codewords can comprise those codewords in a neighborhood including the first codeword in the collection of vector subspaces. In this manner, by reducing the number of codewords within which the second and subsequent codewords are selected, exemplary embodiments of the present invention can effectively reduce the number of bits required to feedback an indication of the selected codewords to the transmitting entity.

According to one aspect of the present invention, a network entity in a T-transmit antenna system is configured for full-spatial-rate coding data over $N_1$ spatial streams such that $N_1=T$. For example, the network entity can comprise a transmitting entity or a receiving entity, where the entity includes a component such as a pre-coder in the case of a transmitting entity, or a channel estimator in the case of a receiving entity. The network entity is capable of providing a full-spatial-rate codebook including a plurality of full-spatial-rate codewords.

In accordance with exemplary embodiments, the provided full-spatial-rate codebook is designed by selecting an underlying partial-spatial-rate codebook designed for a T-transmit antenna system configured for partial-spatial-rate coding data over $N_2$ spatial streams such that $N_2<T$. For example, an underlying partial-spatial-rate codebook $\Pi(T, N_2) \triangleq \{P_1, \ldots P_L\}$ of size L can be selected, where the partial-spatial-rate codebook includes partial-spatial-rate codewords $P_1, \ldots P_L$. The full-spatial-rate codebook can then be designed based upon the underlying partial-spatial-rate codebook. For example, the full-spatial-rate codebook can be designed in accordance with the following:

$$\Pi(T, N_1) \triangleq \left\{ \underbrace{[P_1, P_1^\perp]}_{\tilde{P}_1}, \ldots \underbrace{[P_L, P_L^\perp]}_{\tilde{P}_L} \right\} \triangleq \{\tilde{P}_1, \ldots \tilde{P}_L\},$$

where the full-spatial-rate codebook includes full-spatial-rate codewords $\tilde{P}_1, \ldots \tilde{P}_L$, and $P_l^\perp$ represents the basis vectors of the null space of partial-spatial-rate codeword $P_l$. In this regard, designing the full-spatial-rate codebook can include defining the full-spatial-rate codewords based upon partial-spatial-rate codewords of the partial-spatial rate codebook and basis vectors of a null space of the respective partial-spatial-rate codewords in a multi-dimensional vector space.

More particularly, when the network entity comprises a transmitting entity in a T-transmit antenna system and the component comprises a pre-coder, the pre-coder can be further capable of receiving a stream of at least one piece of data, where the piece(s) of data have been full-spatial-rate coded. The pre-coder can then be capable of weighting at least one of the pieces of data coded over at least one carrier with at least one full-spatial-rate codeword of the full-spatial-rate codebook.

On the other hand, when the network entity comprises a receiving entity in a T-transmit antenna system and the component comprises a receiver, the receiver can be further capable of selecting at least one full-spatial-rate codeword from the full-spatial-rate codebook. In this regard, the full-spatial-rate codeword can be selected such that a stream of at least one piece of data in the T-transmit antenna system is capable of being weighted by the selected full-spatial-rate codeword. In various instances, such as in the case of strong error correction coding, the channel estimator can be capable of selecting a partial-spatial-rate codeword from the underlying partial-spatial-rate codebook by minimizing a distance between a partial-spatial-rate codeword and a matrix identified from a singular value decomposition of a wireless channel matrix. Thereafter, the channel estimator can be capable of selecting a full-spatial-rate codeword based upon the selected partial-spatial-rate codeword.

In other instances, such as in the case of weak error correction coding, the receiver can be capable of selecting a full-spatial-rate codeword by maximizing a minimum signal-to-noise ratio (SNR) across at least a portion of $N_1$ spatial streams over at least a portion of R carriers at an output of the receiving entity. In this regard, the minimum SNR can be based upon a full-spatial-rate codeword. Alternatively, the receiver can be capable of selecting a full-spatial-rate codeword by minimizing a maximum error across at least a portion of $N_1$ spatial streams at an output of the receiving entity. Similar to the SNR, in this instance, the error can be based upon a full-spatial-rate codeword.

The receiver can be capable of selecting a plurality of full-spatial-rate codewords by selecting a given full-spatial-rate codeword for data coded over a given sub-carrier, where the full-spatial-rate codeword can be selected from a full-spatial-rate codebook of size L, such as in a manner indicated above. The next full-spatial-rate codeword for data coded over the next sequential sub-carrier can then be selected. In this regard, the next full-spatial-rate codeword can be selected from a subset of the full-spatial-rate codebook, where the subset can be of size L'<L and selected based upon a distance from the given full-spatial-rate codeword in a collection of vector subspaces, such as a Grassmann manifold, including the full-spatial-rate codewords. More particularly, for example, the next full-spatial-rate codeword can be selected based upon a corresponding partial-spatial-rate codeword, which in turn, can be selected from a subset of the corresponding partial-spatial-rate codebook.

According to other aspects of the present invention a method and computer program product are provided for pre-coding data in a MIMO system. Exemplary embodiments of the present invention therefore provide an improved network entity, method and computer program product for pre-coding data in a MIMO system. Exemplary embodiments of the present invention are capable of providing a full-spatial-rate codebook designed based upon an underlying partial-spatial-rate codebook and the null space of the underlying partial-spatial-rate codebook. Accordingly, exemplary embodiments of the present invention may be capable of implementing a full-spatial-rate case without requiring additional feedback bits over those required in the partial-spatial-rate case. In addition, exemplary embodiments of the present invention are capable of selecting codewords for data coded over various spatial streams and various sub-carriers in accordance with a sub-space tracking method. By selecting codewords in such a manner, exemplary embodiments of the present invention are capable of reducing the number of codewords within which the second and subsequent codewords are selected, thereby reducing the number of bits required to feedback the selected codewords to the transmitting entity. As such, the network entity, method and computer program product exemplary embodiments of the present invention may solve the problems identified by prior techniques and may provide additional advantages.

BRIEF DESCRIPTION OF THE DRAWINGS

Figure 1:
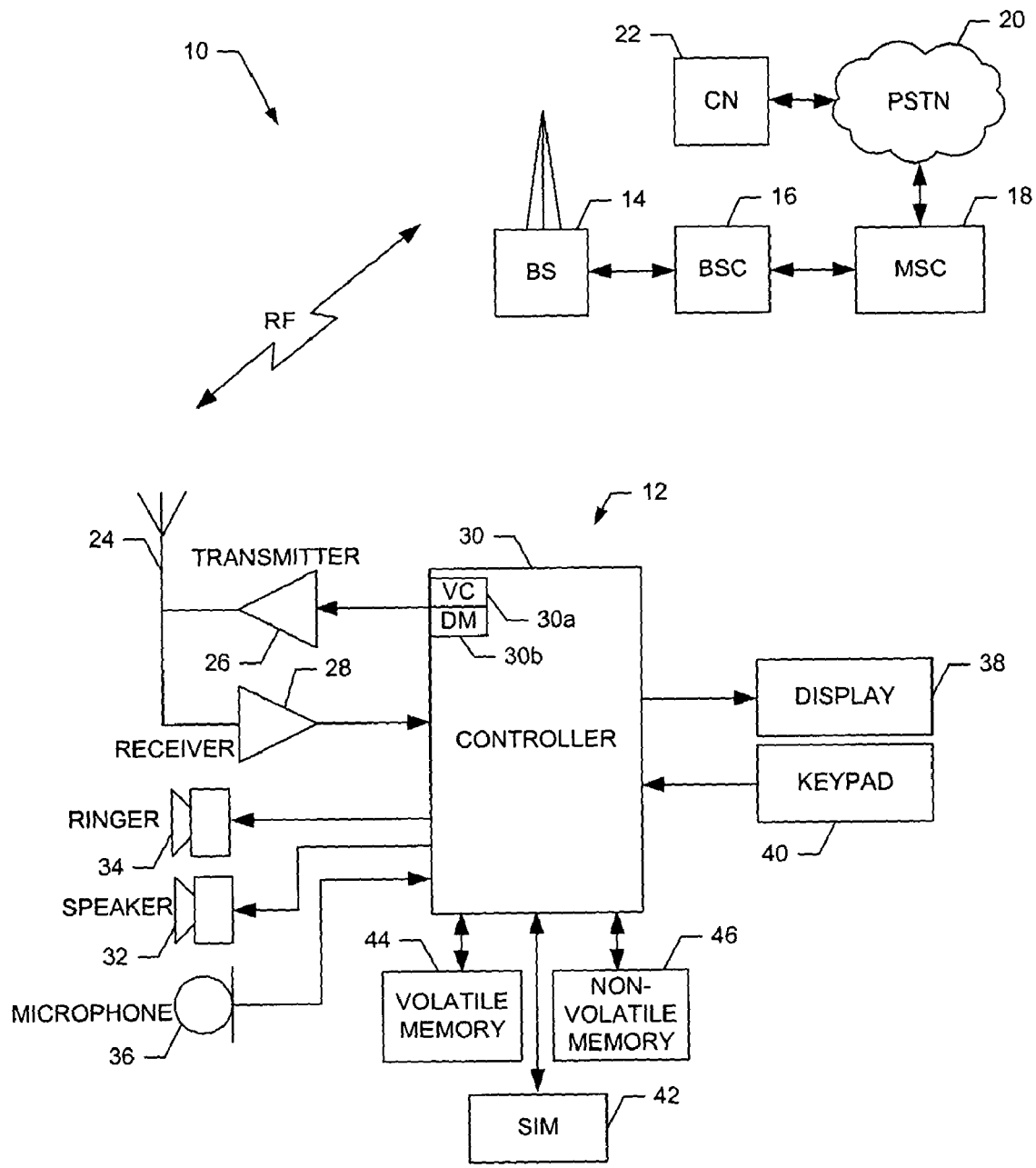
Figure 2:
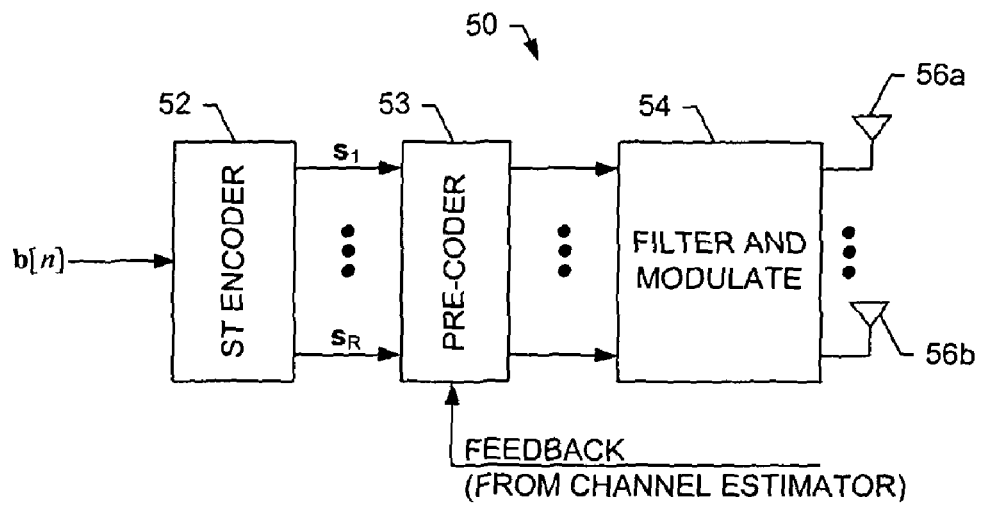
Figure 3:
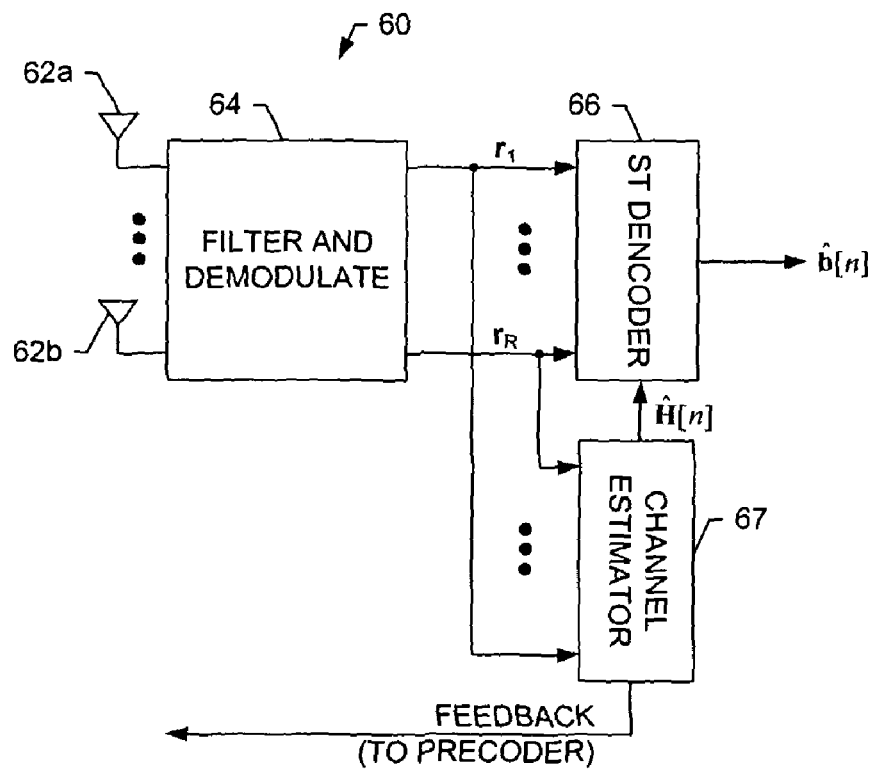
Figure 5:
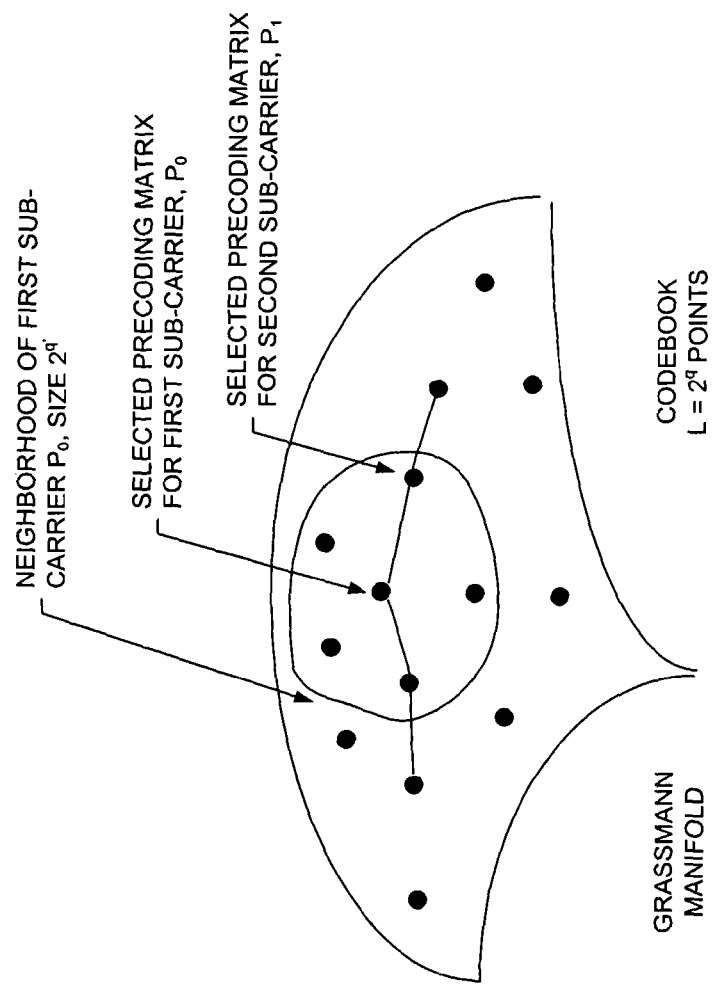
Figure 4:
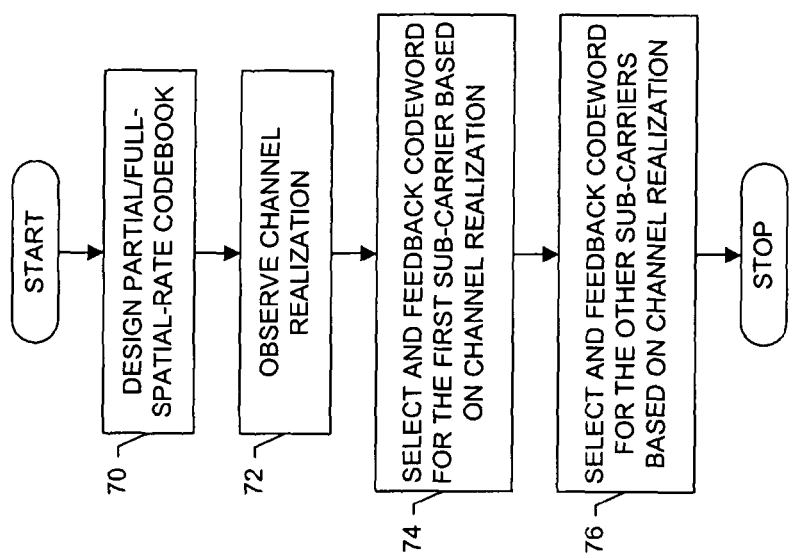

Having thus described the invention in general terms, reference will now be made to the accompanying drawings, which are not necessarily drawn to scale, and wherein:

FIG. 1 illustrates a schematic block diagram of a wireless communication system including a terminal, according to exemplary embodiments of the present invention;

FIG. 2 is a schematic functional block diagram of a multi-antenna transmitting entity of the wireless communication system of FIG. 1, according to exemplary embodiments of the present invention;

FIG. 3 is a schematic functional block diagram of a multi-antenna receiving entity of the wireless communication system of FIG. 1, according to exemplary embodiments of the present invention;

FIG. 4 is a flowchart illustrating various steps in a method of precoding in a multiple-input multiple-output (MIMO) system, in accordance with one exemplary embodiment of the present invention; and FIG. 5 is a schematic illustration of a Grassmann manifold including various precoding matrices therein, in accordance with one exemplary embodiment of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of wireless communications system 10 including a terminal 12 that would benefit from the present invention is provided. As explained below, the terminal may comprise a mobile telephone. It should be understood, however, that such a mobile telephone is merely illustrative of one type of terminal that would benefit from the present invention and, therefore, should not be taken to limit the scope of the present invention. While several exemplary embodiments of the terminal are illustrated and will be hereinafter described for purposes of example, other types of terminals, such as portable digital assistants (PDAs), pagers, laptop computers and other types of voice and text communications systems, can readily employ the present invention. In addition, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The communication system 10 provides for radio communication between two communication stations, such as a base station (BS) 14 and the terminal 12, by way of radio links formed therebetween. The terminal is configured to receive and transmit signals to communicate with a plurality of base stations, including the illustrated base station. The communication system can be configured to operate in accordance with one or more of a number of different types of spread-spectrum communication, or more particularly, in accordance with one or more of a number of different types of spread spectrum communication protocols. More particularly, the communication system can be configured to operate in accordance with any of a number of 1G, 2G, 2.5G and/or 3G communication protocols or the like. For example, the communication system may be configured to operate in accordance with 2G wireless communication protocols IS-95 (CDMA) and/or cdma2000. Also, for example, the communication system may be configured to operate in accordance with 3G wireless communication protocols such as Universal Mobile Telephone System (UMTS) employing Wideband Code Division Multiple Access (WCDMA) radio access technology. Further, for example, the communication system may be configured to operate in accordance with enhanced 3G wireless communication protocols such as 1X-EVDO (TIA/EIA/IS-856) and/or 1X-EVDV. It should be understood that operation of the exemplary embodiment of the present invention is similarly also possible in other types of radio, and other, communication systems. Therefore, while the following description may describe operation of an exemplary embodiment of the present invention with respect to the aforementioned wireless communication protocols, operation of an exemplary embodiment of the present invention can analogously be described with respect to any of various other types of wireless communication protocols, without departing from the spirit and scope of the present invention.

The base station 14 is coupled to a base station controller (BSC) 16. And the base station controller is, in turn, coupled to a mobile switching center (MSC) 18. The MSC is coupled to a network backbone, here a PSTN (public switched telephonic network) 20. In turn, a correspondent node (CN) 22 is coupled to the PSTN. A communication path is formable between the correspondent node and the terminal 12 by way of the PSTN, the MSC, the BSC and base station, and a radio link formed between the base station and the terminal. Thereby, the communications, of both voice data and non-voice data, are effectual between the CN and the terminal. In the illustrated, exemplary implementation, the base station defines a cell, and numerous cell sites are positioned at spaced-apart locations throughout a geographical area to define a plurality of cells within any of which the terminal is capable of radio communication with an associated base station in communication therewith.

The terminal 12 includes various means for performing one or more functions in accordance with exemplary embodiments of the present invention, including those more particularly shown and described herein. It should be understood, however, that the terminal may include alternative means for performing one or more like functions, without departing from the spirit and scope of the present invention. More particularly, for example, as shown in FIG. 1, in addition to one or more antennas 24, the terminal of one exemplary embodiment of the present invention can include a transmitter 26, receiver 28, and controller 30 or other processor that provides signals to and receives signals from the transmitter and receiver, respectively. These signals include signaling information in accordance with the communication protocol(s) of the wireless communication system, and also user speech and/or user generated data. In this regard, the terminal can be capable of communicating in accordance with one or more of a number of different wireless communication protocols, such as those indicated above. Although not shown, the terminal can also be capable of communicating in accordance with one or more wireline and/or wireless networking techniques. More particularly, for example, the terminal can be capable of communicating in accordance with local area network (LAN), metropolitan area network (MAN), and/or a wide area network (WAN) (e.g., Internet) wireline networking techniques. Additionally or alternatively, for example, the terminal can be capable of communicating in accordance with wireless networking techniques including wireless LAN (WLAN) techniques such as IEEE 802.11, and/or WiMAX techniques such as IEEE 802.16 or the like.

It is understood that the controller 30 includes the circuitry required for implementing the audio and logic functions of the terminal 12. For example, the controller may be comprised of a digital signal processor device, a microprocessor device, and/or various analog-to-digital converters, digital-to-analog converters, and other support circuits. The control and signal processing functions of the terminal are allocated between these devices according to their respective capabilities. The controller can additionally include an internal voice coder (VC) 30a, and may include an internal data modem (DM) 30b. Further, the controller may include the functionally to operate one or more client applications, which may be stored in memory (described below).

The terminal 12 can also include a user interface including a conventional earphone or speaker 32, a ringer 34, a microphone 36, a display 38, and a user input interface, all of which are coupled to the controller 18. The user input interface, which allows the terminal to receive data, can comprise any of a number of devices allowing the terminal to receive data, such as a keypad 40, a touch display (not shown) or other input device. In exemplary embodiments including a keypad, the keypad includes the conventional numeric (0-9) and related keys (#, *), and other keys used for operating the terminal. Although not shown, the terminal can include one or more means for sharing and/or obtaining data (not shown).

In addition, the terminal 12 can include memory, such as a subscriber identity module (SIM) 42, a removable user identity module (R-UIM) or the like, which typically stores information elements related to a mobile subscriber. In addition to the SIM, the terminal can include other removable and/or fixed memory. In this regard, the terminal can include volatile memory 44, such as volatile Random Access Memory (RAM) including a cache area for the temporary storage of data. The terminal can also include other non-volatile memory 46, which can be embedded and/or may be removable. The non-volatile memory can additionally or alternatively comprise an EEPROM, flash memory or the like. The memories can store any of a number of client applications, instructions, pieces of information, and data, used by the terminal to implement the functions of the terminal.

As described herein, the client application(s) may each comprise software operated by the respective entities. It should be understood, however, that any one or more of the client applications described herein can alternatively comprise firmware or hardware, without departing from the spirit and scope of the present invention. Generally, then, the network entities (e.g., terminal 12, BS 14, BSC 16, etc.) of exemplary embodiments of the present invention can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective network entity or more particularly, for example, a processor or controller of the respective network entity. The design of integrated circuits is by and large a highly automated process. In this regard, complex and powerful software tools are available for converting a logic level design into a semiconductor circuit design ready to be etched and formed on a semiconductor substrate. These software tools, such as those provided by Avant! Corporation of Fremont, Calif. and Cadence Design, of San Jose, Calif., automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Reference is now made to FIGS. 2 and 3, which illustrate a functional block diagram of the system 10 of FIG. 1 in accordance with one exemplary embodiment of the present invention. More particularly, FIG. 2 illustrates a functional block diagram of a multi-antenna transmission system including a transmitting entity 50 (e.g., base station 14). The illustrated system is operating as a multiple-input multiple-output (MIMO) communication system that also includes a multiple-antenna receiving entity 60 (e.g., terminal 12), as shown more particularly in FIG. 3. It should be understood, however, that the system of exemplary embodiments of the present invention may equally operate in other configuration without departing from the spirit and scope of the present invention. It should further be understood that the transmitting and receiving entities may be implemented into any of a number of different types of transmission systems that transmit coded or uncoded digital transmissions over a radio interface.

In the illustrated MIMO communication system 10, the transmitting entity 50 includes a MIMO transmitter having a number of components. The components of the transmitter, in turn, include space-time (ST) encoder 52, a pre-coder 53, a filter and modulate (SFM) block 54 and T transmit antennas 56 (two being shown as antennas 56a and 56b). In the transmitting entity, the transmitter receives an input symbol stream b[n], such as an input orthogonal frequency division multiple access (OFDMA) symbol stream, an input orthogonal frequency division multiplexed (OFDM) symbol stream or the like. For a T antenna transmitting entity, the ST encoder is capable of coding the symbol stream over R carriers in accordance with a ST technique based upon a plurality of ST codes, the ST encoder thereby forming coded symbols $s_1, \ldots, s_R$. The pre-coder can weight the coded symbols of the symbol stream with pre-coding matrices $P_i$'s to form a weighted symbol stream that can then be filtered and modulated by the SFM block, and transmitted by the T antennas. As explained below, the pre-coder selects the pre-coding matrices $P_i$'s from a codebook P of matrices. The codebook may be of size $L=2^q$ and include a set of T×M unitary matrices $P=\{P_1, \ldots, P_L\}$, where q may represent the number of (feedback) bits required to index the codebook.

At the receiving entity 60, the receiving entity includes a receiver having a number of components. In this regard, the components of the receiver include M receive antennas 62 (two being shown as antennas 62a and 62b) where M is greater than or equal to the number of spatial streams N, a filter and demodulate (FDD) block 64, a ST decoder 66 and a channel estimator 67. The receive antenna receives the data transmitted from the transmitting entity 50 and passes the data to the FDD block, which filters and demodulates the data into representations of the coded symbol stream from the transmitting entity, $r_1, \ldots, r_R$. For each carrier k, then, a representation of the coded symbol stream $r_k$ may be written as follows:

$$r_k = H_k P_{i_k} s_k + n_k$$

where $P_{i_k}$ represents the precoding matrix selected from a codebook according to the channel matrix $H_k$, and $n_k$ represents the additive white Gaussian noise (AWGN) with variance $N_0$.

The representations of the coded symbol stream $r_1, \ldots, r_R$ follow the FDD block 64 into the ST decoder 66 and channel estimator 67. The channel estimator, then, outputs estimated channel parameters, or more particularly an estimated channel matrix $\hat{H}[n]$, to the ST decoder. In addition, the channel estimator outputs the estimated channel parameters to the pre-coders 53 of the transmitter via a feedback channel. The ST decoder, then, can decode representations of the input symbol stream $\hat{b}[n]$ from the representations of the coded symbols, as well as the estimated channel matrix.

With respect to FIG. 4, and as explained further below, a method of pre-coding in a MIMO system in accordance with exemplary embodiments of the present invention includes designing the codebook P, where the codebook is made known to both the transmitting entity 50 and the receiving entity 60, as shown in block 70. For partial-spatial-rate cases, for example, the codebook can be designed for a transmitting entity having a greater number of transmit antennas 56 T than the number of spatial streams N over which the input symbol stream is coded (i.e., T>N). For full-spatial-rate cases, on the other hand, the codebook can be designed for a transmitting entity having a number of transmit antennas T equaling the number of spatial streams N (i.e., T=N). In such instances, the full-spatial-rate codebook can be designed by designing a partial-spatial-rate codebook, and then generating the full-spatial-rate codebook based thereon. Irrespective of exactly how the codebook is designed and made known to the transmitting and receiving entities, those entities can thereafter utilize the codebook to pre-code coded symbols $s_1, \ldots, s_N$ at the transmitting entity, before transmission therefrom to the receiving entity.

After the codebook is designed and made known to the transmitting entity 50 and the receiving entity 60, for example, the receiving entity can observe a channel realization, as shown in block 72. Based upon the channel realization, then, the receiving entity can select a codeword of the codebook, such as a codeword for a first carrier, and feed back, to the transmitting entity, information or other data from which the selected codeword can be identified (e.g., the index of the codeword in the codebook), as shown in block 74. Before, after or as the information is fed back to the transmitting entity, however, the receiving entity can similarly select and feed back a codeword indication for the other carriers, as shown in block 76. In various instances, the receiving entity selects a codeword for each of R carriers (such as sub-carriers in an OFDM symbol), using $q=\log_2 L$ bits (from a codebook of size L) to feedback the selected codeword for that carrier. In accordance with such a technique, a total of R×q bits may be required to feedback the selected codewords. Exemplary embodiments of the present invention, however, are capable of further reducing the number of bits required to feedback the selected codeword by selecting codewords in a manner dependent across the carriers by exploiting a correlation of frequency responses at different carriers, as explained below. Irrespective of the exact nature of the information fed back, the transmitting entity can then locate the respective codeword based upon the feedback information, and pre-code the coded symbols for transmission to the receiving entity.

A. Codebook Design

As indicated above, a method of pre-coding in a MIMO system in accordance with exemplary embodiments of the present invention includes designing the codebook P, which may differ for partial-spatial-rate cases (T>N) and full-spatial-rate cases (T=N).

1. Partial-Spatial-Rate Codebook Design

If the entries of the channel matrix H are independently Gaussian distributed, the subspaces corresponding to the maximal eigenvalue of the channel are isotropically distributed. Accordingly, the codebook design becomes to a subspace packing in a collection of vector subspaces of a vector space, such as a Grassmann manifold, with large minimum distance. Nonetheless, the codebook can be designed in accordance with any of a number of different techniques that can achieve similar precoding performance. One such technique for generating a codebook is described in B. M. Hochwald et al., *Systematic Design of Unitary Space-Time Constellation*, 46 IEEE TRANS. INFORMATION THEORY 1962-73 (2000) (Hochwald), the contents of which are hereby incorporated by reference in its entirety. In this regard, the technique described by Hochwald can be used to generate a codebook with block-circulant structure, which can simplify the codeword selection and storage.

More particularly, in accordance with exemplary embodiments of the present invention, the codebook for the partial-spatial-rate case can be fully specified once the first codeword $P_1$ and a diagonal rotation matrix Q is provided. The other codewords in the codebook, then, can be given by:

$$P_l = Q^l P_1$$

where $l=2, \ldots L$. Also in the preceding equation, Q represents a diagonal matrix fully parameterized by an integer vector $u \triangleq [u_1, \ldots u_T]$:

$$Q = diag\left(\left[e^{j\frac{2\pi}{L}u_1} \ldots e^{j\frac{2\pi}{L}u_T}\right]\right) = \begin{bmatrix} e^{j\frac{2\pi}{L}u_1} & & 0 \\ & \ddots & \\ 0 & & e^{j\frac{2\pi}{L}u_T} \end{bmatrix}$$

Furthermore, in this design, the first codeword $P_1$ is chosen to be a T×N sub-matrix of an T×T DFT (discrete Fourier transform) matrix $D_T$ whose (m, n) element can be specified as follows:

$$(D_T)_{m,n} = e^{j\frac{2\pi}{T}(m-1)(n-1)}$$

where $1 \leq m$, $n \leq T$. Denoting $d_c$ as the cth column of the matrix $D_T$, then, the first codeword $P_1$ can comprise the collection of N columns parameterized by the set of column indices $c \triangleq [c_1, \ldots c_N]$ (i.e, $P_1 = [d_{c_1}, \ldots d_{c_T}]$).

Table 1, below, illustrates various selections of $u \triangleq [u_1, \ldots u_T]$ and $c \triangleq [c_1, \ldots c_N]$ for different numbers of transmitter antennas T, and spatial streams N. Note that the choice of L can be the result of trading off performance with the number of feedback bits. For example, the codebook size may be set as L=8 for the T=2, N=1 case as the performance gain may diminish with more than 3 feedback bits.

TABLE 1

Codebooks for Different Antenna Configurations

| T (Number of Antennas 56) | N (Number of Spatial Streams) | L/(q = log₂L) Codebook size/ (feedback bits) | $c \triangleq [c_1, \ldots c_N]$ Column Indices | $u \triangleq [u_1, \ldots u_T]$ Rotation Vector |
|---|---|---|---|---|
| 2 | 1 | 8/(3) | [1] | [1, 0] |
| 3 | 1 | 32/(5) | [1] | [1, 26, 28] |
| 3 | 2 | 32/(5) | [1, 2] | [1, 26, 28] |
| 4 | 1 | 64/(6) | [1] | [1, 8, 61, 45] |
| 4 | 2 | 64/(6) | [0, 1] | [1, 7, 52, 56] |
| 4 | 3 | 64/(6) | [0, 2, 3] | [1, 8, 61, 45] |

2. Full-Spatial-Rate Codebook Design

The codebook described above is particularly suitable for the partial-spatial-rate case (T>N), and may therefore differ from a codebook designed for the full-spatial-rate case (T=N). Like the previous codebook design, the codebook for the full-spatial-rate case can be designed in any of a number of different manners. In accordance with exemplary embodiments of the present invention, for example, the full-spatial-rate codebook can be designed by "completing" the partial-rate codebook for the respective system configuration, such as for a respective one of those given in Table 1. For purposes of illustration in describing a method of designing a full-spatial-rate codebook based upon a respective partial-spatial-rate codebook, consider $T=N_1=4$. The method, then, can include selecting an underlying partial-spatial-rate codebook, such as a codebook designed for a transmitting entity 50 having the same number of antennas 56. Thus, for example, for the full-spatial-rate case $T=N_1=4$, the underlying partial-spatial-rate codebook for the case T=4, $N_2=3$ can be selected (see the last row of Table 1). Written notationally, the underlying partial-spatial-rate case can be expressed as follows:

$$\Pi(4,3) \triangleq \{P_1, \ldots P_L\}$$

where $\Pi(4,3)$ represents the codebook for the case T=4, N=3, and the codebook size L=64. Note that in the foregoing partial-spatial-rate codebook, each codeword can comprise a 4×3 (i.e., T×$N_2$) unitary matrix.

After selecting an underlying partial-spatial-rate codebook, the full-spatial-rate codebook can be designed by finding, for each codeword $P_l$, the basis vectors of the null space of $P_l$ in a four-dimensional complex vector space (a dimension for each transmit antenna 56). More particularly, denoting $P_l^\perp$ as the basis vectors associated with the null space of $P_l$, the full-spatial-rate codebook for the case $T=N_1=4$ can be designed as follows:

$$\Pi(4,4) \triangleq \left\{ \underbrace{[P_1, P_1^\perp]}_{\tilde{P}_1}, \ldots \underbrace{[P_L, P_L^\perp]}_{\tilde{P}_L} \right\} \triangleq \{\tilde{P}_1, \ldots \tilde{P}_L\}$$

In the preceding, then, each full-rate codeword can comprise a 4×4 (i.e., T×$N_1$) unitary matrix defined by $\tilde{P}_l \triangleq [P_l, P_l^\perp]$. As will be appreciated, by designing the full-spatial-rate codebook based upon the basis vectors of the null space of a selected underlying partial-spatial-rate codebook, the number of bits required to feedback a selected codeword in the full-spatial-rate case may remain the same as feeding back a corresponding codeword in the partial-spatial-rate case of the underlying codebook. Thus, the full-spatial-rate case may be implemented without requiring additional feedback bits over those required in the partial-spatial-rate case.

B. Codeword Selection

After designing the codebook and making the codebook known to the transmitting entity 50 and the receiving entity 60, the receiving entity can observe a channel realization and select a codeword of the codebook based on the observed channel realization. In this regard, it should be noted that the receiving entity can comprise any of a number of different types of receivers capable of processing data from the transmitting entity, such as a maximum likelihood (ML) receiver, linear minimum mean square error (LMMSE) receiver or the like. As with designing the codebook, however, selection of the codeword from the codebook may differ for partial-spatial-rate cases (T>N) and full-spatial-rate cases (T=N).

1. Partial-Spatial-Rate Codeword Selection

For the MMSE receiver, the MSE at the output of the receiver can be a function of the preceding matrix $P_l$ used at the transmitter:

$$MSE(P_l) = \frac{E_s}{N_o} tr\left\{ \left(I_N + \frac{E_s}{N_r N_o} P_l^H H^H H P_l \right)^{-1} \right\}$$

Accordingly, the receiving entity 60, or more particularly the channel estimator 67 of the receiving entity, can select a precoding matrix (i.e., codeword), or more particularly the index of a precoding matrix, by calculating the index of the preceding matrix minimizing the MSE. Written notationally, the channel estimator can select the index as follows:

$$l_{opt} = \arg \min_{l \in \{1, \ldots L\}} MSE(P_L)$$

Within the codebook $P = \{P_1, \ldots, P_L\}$, precoding matrix $P_{opt} = P_l$, $l = l_{opt}$ can be selected, with the index $l_{opt}$ of the respective matrix being fed back to the transmitting entity 50, or more particularly the pre-coder 53 of the transmitting entity.

2. Full-Spatial-Rate Codeword Selection

In the full-spatial-rate case, the receiving entity 60, or more particularly the channel estimator 67 of the receiving entity, can select a precoding matrix in a manner based upon an amount of forward error correction available in the system. That is, if the error correction coding (e.g., forward error correction (FEC)) is strong (e.g., rate ½ coding), the channel estimator can select a precoding matrix in a manner that takes advantage of the structure of the codebook by aligning the dominant right singular vectors with one of the underlying partial-rate codewords. If the error correction coding is weak (e.g., rate ¾ coding), however, the channel estimator may resort to an algorithm that maximizes the minimum signal-to-noise ratio (SNR) across all spatial streams at the output of the receiving entity (e.g., LMMSE or LMMSE/DFE (decision feedback equalizer) receiving entity). Similar to before, after selecting the precoding matrix $P_{opt}$ the index of the respective matrix can be fed back to the transmitting entity 50, or more particularly the pre-coder 53 of the transmitting entity.

a) Selection with Strong FEC

In the full-spatial-rate case with strong error correction coding, the channel estimator 67 can select a precoding matrix (i.e., codeword) by at least partially aligning a corresponding codeword from the underlying partial-spatial-rate codebook with the dominant singular vectors of the matrix. In this regard, let $H \triangleq SU\tilde{V}$ denote the singular value decomposition (SVD) of the channel matrix, and let $\tilde{V} \triangleq [V, V^{195}]$ denote the right singular matrix. In such an instance, it should be noted that the singular values may be organized in condescending order in the matrix U. With such an assumption, then, V can include all the dominant right singular vectors, while $V^\perp$ can include the least significant right singular vectors. Accordingly, the channel estimator can select a precoding matrix $P_{opt}$ by minimizing a distance (e.g., Chordal distance) between the significant singular vectors V and the underlying partial-rate codewords, such as in accordance with the following:

$$\tilde{P}_{opt} \triangleq [P_{opt}, P_{opt}^\perp], \text{ while } P_{opt} = \arg\min_{P_l, l=1,\ldots L} d_{cdl}^2(V, P_l)$$

In the preceding, $d_{cdl}^2$ represents the Chordal distance between matrices A and B, and can be written notationally as follows:

$$d_{cdl}^2(A,B) \triangleq N_c - \text{trace}((A^H B)^H A^H B)$$

where the number of columns of each matrix is denoted by $N_c$.

b) Selection with Weak FEC

If the error correction in the system is weak, the channel estimator 67 can select a precoding matrix (i.e., codeword) based upon the effective SNR across all, or at least a portion, of the spatial streams at the output of the receiving entity 60. At the output of an LMMSE or LMMSE/DFE receiving entity, for example, the effective SNR of each spatial stream can be calculated once a bias introduced by the LMMSE algorithm is removed from the signal at the filter output. In this regard, let $\gamma_k(\tilde{P}_l)$, $k=1, \ldots N$, denote the SNR of the kth spatial stream at an LMMSE or LMMSE/DFE filter output, assuming that the lth codeword $\tilde{P}_l$ is applied at the transmitting entity 50. The channel estimator, then can select a precoding matrix in an attempt to maximize the minimum of SNRs across all, or at least a portion, of the spatial streams, such as in accordance with the following:

$$\tilde{P}_{opt} = \arg\max_{P_l, l=1,\ldots L}\left(\min_{k=1,\ldots N} \gamma_k(\tilde{P}_l)\right)$$

Alternatively, let $\xi_k(\tilde{P}_l)$, $k=1, \ldots N$ denote the post-filtering MSE of the kth spatial stream, assuming that the lth codeword $\tilde{P}_l$ is applied at the transmitting entity. In such an instance, a min-max problem can be found that that will reach the same selection as prescribed by the following:

$$\tilde{P}_{opt} = \arg\min_{P_l, l=1,\ldots L}\left(\max_{k=1,\ldots N} \xi_k(\tilde{P}_l)\right)$$

C. Sub-Space Tracking

As explained above, the receiving entity 60 can select a codeword for each of the R carriers, and use $q=\log_2 L$ bits (from a codebook of size L) to feedback the selected codeword for that carrier. In accordance with such a technique, a total of R×q bits may be required to feedback the selected codewords. Exemplary embodiments of the present invention, however, are capable of implementing a sub-space tracking method to further reduce the number of bits required to feedback the selected codeword. In accordance with the sub-space tracking method, the selections of pre-coding matrices may be made dependent across the carriers by exploiting a correlation of frequency responses at different carriers. In this regard, as the frequency responses at adjacent carriers may be correlated, there may also be a correlation between the pre-coding matrices for the respective carriers.

1. Partial-Spatial-Rate Sub-Space Tracking

Before describing the sub-space tracking method in the partial-spatial-rate case, consider the distance between points in a Grassmann manifold. In this regard, the chordal distance in the manifold $G_{T,N}$ can be defined as follows:

$$d_c^2(P_l, P_k) = \sum_{n=1}^{N} \sin^2(\theta_n)$$
$$= N - \|P_l^H, P_k\|^2$$

where the $\theta_m$'s represent the principle angles between the sub-spaces spanned by the columns of $P_l$ and $P_k$, $\|\cdot\|$ represents the Frobenius norm, N represent the number of spatial streams, and H represents a Hermitian symmetric operation. Based on the chordal distance, then, an L'-element neighborhood of any point $P_i$ in a codebook P may be defined as the L' elements in P that have minimum or shortal chordal distances to $P_i$. In a codebook P of size $L=2^q$, then, a neighborhood subset $W_i \subset P$ of size $L'=2^{q'}$ can be assigned for each codeword $P_i$, where $q'<q$. The subset $W_i$ can include the L' matrices of the codebook that are closest to $P_i$ in the Grassmann manifold, as shown in FIG. 5.

With that background, the sub-space tracking method in the partial-spatial-rate case of one exemplary embodiment of the present invention can include defining a step size K for updating the selected precoding matrix. The step size K can be defined in a number of different manners, such as in a manner based upon channel statistics (e.g., delay profile, etc.). Before or after defining the step size, or as the step size is defined, a first preceding matrix (i.e., first codeword) $P_{i_o}$ can be selected for the first spatial stream, where the first preceding matrix may be selected out of $L=2^q$ possibilities using the full precision ($q=\log_2 L$ bits) of the codebook P, such as in any of a number of different manners including those explained above.

After selecting the first precoding matrix $P_{i_o}$ for the first carrier, a second precoding matrix $P_{i_1}$ can be selected for the second carrier. More particularly, the first preceding matrix can be associated with the first K carriers, and in such instances, a second precoding matrix can be selected for the second K carriers. As a desired second precoding matrix may be found in a neighborhood of matrices including the first preceding matrix, selecting the second precoding matrix can include identifying a neighborhood subset $W_{i_o}$ of precoding matrices including the first precoding matrix $P_{i_o}$, such as by identifying the subset of precoding matrices that are closest to $P_{i_o}$ in the Grassmann manifold, as explained above. In this regard, the number of closest matrices can be selected in a number of different manners. For example, the number of closest matrices L' can be heuristically selected as $L'=1\sim 2\times(2\times N\times(T-N))$.

After selecting the neighborhood subset $W_{i_o}$, the second preceding matrix $P_{i_1}$ for the second K carriers can be selected from the matrices included therein, such as in any of a number of different manners including those explained above. Assuming that the neighborhood including the first precoding matrix $P_{i_o}$ includes $L'=2^{q'}$ points ($q'<q$), the number of feedback bits required for the second carrier can be effectively reduced to q' (i.e., the second preceding matrix can be selected out of the $L'=2^{q'}$ possibilities in neighborhood $W_{i_o}$). The same process can then be repeated for all, or more particularly all R/K−1 carrier clusters, with precoding matrix for spatial stream cluster j being selected from the neighborhood of matrices including the precoding matrix selected for carrier cluster j−1 (i.e., $P_{i_{j-1}}$, j=1, . . . R/K−1). As can be seen, then, the number of bits required to feedback the selected codewords can be reduced from a total of R×q bits to a total of q+q'×(R/K−1).

The sub-space tracking method in the partial-spatial rate case of one exemplary embodiment can accordingly be summarized as follows: at step 1, set step size K and initial preceding matrix $P_{i_j}$, j=0, and feed back the index of $P_{i_j}$. Then, at step 2, select and feed back a next preceding matrix $P_{i_{j+1}}$ from the subset $W_{i_j}$ as the precoding matrix of next K carriers. Next, at step 3, if j<R/K, set j=j+1 and repeat step 2. Although the precoding matrices for the respective carriers are described as being fed back as those matrices are selected, it should be understood that the matrices may be fed back in any of a number of different manners, including collectively feeding back the matrices for all of the carriers after all of the respective matrices have been selected.

2. Full-Spatial-Rate Sub-Space Tracking

As in the partial-spatial-rate case, the preceding matrices (i.e., codewords) can be selected in a manner dependent across the carriers in accordance with a sub-space tracking method of exemplary embodiments of the present invention. More particularly, in one exemplary embodiment, the sub-space tracking method in the full-spatial-rate case can be implemented by extending the corresponding method in the partial-spatial-rate case (explained above) in a manner that exploits the structure of the full-spatial-rate codebook. In this regard, since each codeword in the full-spatial-rate case $\tilde{P}_l \triangleq$ $[P_l, P_l^\perp]$ can be uniquely determined based upon an underlying partial-spatial-rate codeword $P_l$, sub-space tracking in the full-spatial-rate case can include tracking of the underlying codeword $P_l$ across different carriers, such as in a manner explained above with respect to sub-space tracking in the partial-spatial-rate case. A corresponding codeword in the full-spatial-rate case can then be identified based upon the respective underlying codeword, such as in the same manner explained above with respect to designing the full-spatial-rate codebook by "completing" the partial-rate codebook.

According to one exemplary aspect of the present invention, the functions performed by one or more of the entities of the system, such as the terminal 12, BS 14 and/or BSC 16 including respective transmitting and receiving entities 50, 60, may be performed by various means, such as hardware and/or firmware, including those described above, alone and/or under control of one or more computer program products. The computer program product(s) for performing one or more functions of exemplary embodiments of the present invention includes at least one computer-readable storage medium, such as the non-volatile storage medium, and software including computer-readable program code portions, such as a series of computer instructions, embodied in the computer-readable storage medium.

In this regard, FIG. 4 is a flowchart of methods, systems and program products according to exemplary embodiments of the present invention. It will be understood that each block or step of the flowchart, and combinations of blocks in the flowchart, can be implemented by various means, such as hardware, firmware, and/or software including one or more computer program instructions. These computer program instructions may be loaded onto a computer or other programmable apparatus to produce a machine, such that the instructions which execute on the computer or other programmable apparatus create means for implementing the functions specified in the flowchart block(s) or step(s). As will be appreciated, any such computer program instructions may also be stored in a computer-readable memory that can direct a computer or other programmable apparatus (i.e., hardware) to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least perform the following:
providing a full-spatial-rate codebook in a T-transmit antenna system configured for full-spatial-rate coding data over $N_1$ spatial streams such that $N_1=T$, the full-spatial-rate codebook comprising a plurality of full-spatial-rate codewords, the full-spatial-rate codebook having been designed by:
selecting an underlying partial-spatial-rate codebook designed for a T-transmit antenna system configured for partial-spatial-rate coding data over $N_2$ spatial streams such that $N_2<T$; and
designing the full-spatial-rate codebook based upon the underlying partial-spatial-rate codebook, designing the full-spatial-rate codebook including defining the full-spatial-rate codewords based upon partial-spatial-rate codewords of the partial-spatial rate codebook and basis vectors of a null space of the respective partial-spatial-rate codewords in a multi-dimensional vector space,
wherein providing a full-spatial-rate codebook comprises providing a full-spatial-rate codebook such that a stream of at least one piece of data in a T-transmit antenna system is capable of being weighted by the full-spatial-rate codewords of the full-spatial-rate codebook.

2. An apparatus according to claim 1, wherein providing a full-spatial-rate codebook comprises providing a full-spatial-rate codebook having been designed by:
selecting an underlying partial-spatial-rate codebook $\Pi(T, N_2)\underline{\underline{\Delta}}\{P_1, \ldots P_L\}$ of size L, the partial-spatial-rate codebook including partial-spatial-rate codewords $P_1, \ldots P_L$; and
designing the full-spatial rate codebook based upon the underlying partial-spatial-rate codebook as follows:

$$\Pi(T, N_1) \underline{\underline{\Delta}} \left\{ \underbrace{[P_1, P_1^\perp]}_{\tilde{P}_1}, \ldots \underbrace{[P_L, P_L^\perp]}_{\tilde{P}_L} \right\} \square \{\tilde{P}_1, \ldots \tilde{P}_L\},$$

the full-spatial-rate codebook including full-spatial-rate codewords $\tilde{P}_1, \ldots \tilde{P}_L$, and wherein $P_1^\perp$ represents the basis vectors of the null space of partial-spatial-rate codeword $P_1$.

3. An apparatus according to claim 1, wherein execution of the executable instructions by the processor further causes the apparatus to perform the following:
receiving a stream of at least one piece of data in a T-transmit antenna system, the at least one piece of data having been full-spatial-rate coded; and
weighting at least one of the pieces of data coded over at least one carrier with at least one full-spatial-rate codeword of the full-spatial-rate codebook.

4. An apparatus according to claim 1, wherein execution of the executable instructions by the processor further causes the apparatus to perform the following:
selecting at least one full-spatial-rate codeword from the full-spatial-rate codebook such that a stream of at least one piece of data in the T-transmit antenna system is capable of being weighted by the selected full-spatial-rate codeword.

5. An apparatus according to claim 4, wherein selecting at least one full-spatial-rate codeword comprises, for each of the at least one full-spatial-rate codewords:
selecting a partial-spatial-rate codeword from the underlying partial-spatial-rate codebook by minimizing a distance between a partial-spatial-rate codeword and a matrix identified from a singular value decomposition of a wireless channel matrix; and
selecting a full-spatial-rate codeword based upon the selected partial-spatial-rate codeword.

6. An apparatus according to claim 4, wherein selecting at least one full-spatial-rate codeword comprises, for each of the at least one full-spatial-rate codewords:
selecting a full-spatial-rate codeword by maximizing a minimum signal-to-noise ratio (SNR) across at least a portion of $N_1$ spatial streams over at least a portion of R carriers at an output of the apparatus, the minimum SNR being based upon a full-spatial-rate codeword.

7. An apparatus according to claim 4, wherein selecting at least one full-spatial-rate codeword comprises, for each of the at least one full-spatial-rate codeword:
selecting a full-spatial-rate codeword by minimizing a maximum error across at least a portion of $N_1$ spatial streams over at least a portion of R carriers at an output of the apparatus, the error being based upon a full-spatial-rate codeword.

8. An apparatus according to claim 4, wherein selecting at least one full-spatial-rate codeword comprises, for a plurality of full-spatial-rate codewords by:
selecting a given full-spatial-rate codeword for data coded over a given carrier, the full-spatial-rate codeword being selected from a full-spatial-rate codebook of size L; and
selecting a next full-spatial-rate codeword for data coded over a next carrier, the next full-spatial-rate codeword being selected from a subset of the full-spatial-rate codebook, the subset being of size L'<L and selected based upon a distance from the given full-spatial-rate codeword in a collection of vector subspaces including the full-spatial-rate codewords.

9. An apparatus according to claim 8, wherein selecting the a given full-spatial-rate codeword by comprises:
selecting a given partial-spatial-rate codeword from an underlying partial-spatial-rate codebook of size L by minimizing a distance between a partial-spatial-rate codeword and a matrix identified from a singular value decomposition of a wireless channel matrix; and
selecting a given full-spatial-rate codeword based upon the selected given partial-spatial-rate codeword.

10. An apparatus according to claim 9, wherein selecting a next full-spatial-rate codeword comprises:
selecting a next partial-spatial-rate codeword from a subset of the underlying partial-spatial-rate codebook by minimizing a distance between a partial-spatial-rate codeword and a matrix identified from a singular value decomposition of a wireless channel matrix, the subset being of size L'<L and selected based upon a distance from the given partial-spatial-rate codeword in a collection of vector subspaces including the partial-spatial-rate codewords; and
selecting a next full-spatial-rate codeword based upon the selected next partial-spatial-rate codeword.

11. An apparatus comprising a processor and a memory storing executable instructions that in response to execution by the processor cause the apparatus to at least perform the following:
   providing a spatial-rate codebook in a T-transmit antenna system configured for spatial-rate coding data over N spatial streams, the spatial-rate codebook comprising a plurality of spatial-rate codewords; and
   selecting or receiving a selection of a plurality of spatial-rate codewords from the spatial-rate codebook such that a stream of at least one piece of data in the T-transmit antenna system is capable of being weighted by the selected spatial-rate codewords, the plurality of spatial-rate codewords being selected by:
      selecting a given spatial-rate codeword for data coded over a given carrier, the spatial-rate codeword being selected from a spatial-rate codebook of size L; and
      selecting a next spatial-rate codeword for data coded over a next carrier, the next spatial-rate codeword being selected from a subset of the spatial-rate codebook, the subset being of size L'<L and selected based upon a distance from the given spatial-rate codeword in a collection of vector subspaces including the spatial-rate codewords.

12. An apparatus according to claim 11, wherein providing a spatial-rate-codebook comprises providing a full-spatial-rate codebook in a T-transmit antenna system configured for full-spatial-rate coding data over $N_1$ spatial streams such that $N_1 = T$, the full-spatial-rate codebook comprising a plurality of full-spatial-rate codewords, and wherein the full-spatial-rate codeword is selected by:
   selecting a given partial-spatial-rate codeword from an underlying partial-spatial-rate codebook of size L by minimizing a distance between a partial-spatial-rate codeword and a matrix identified from a singular value decomposition of a wireless channel matrix; and
   selecting a given full-spatial-rate codeword based upon the selected given partial-spatial-rate codeword.

13. An apparatus according to claim 12, wherein the next full-spatial-rate codeword is selected by:
   selecting a next partial-spatial-rate codeword from a subset of the underlying partial-spatial-rate codebook by minimizing a distance between a partial-spatial-rate codeword and a matrix identified from a singular value decomposition of a wireless channel matrix, the subset being of size L'<L and selected based upon a distance from the given partial-spatial-rate codeword in a collection of vector subspaces including the partial-spatial-rate codewords; and
   selecting a next full-spatial-rate codeword based upon the selected next partial-spatial-rate codeword.

14. An apparatus according to claim 11, wherein providing a spatial-rate-codebook comprises providing a full-spatial-rate codebook in a T-transmit antenna system configured for full-spatial-rate coding data over $N_1$ spatial streams such that $N_1 = T$, the full-spatial-rate codebook comprising a plurality of full-spatial-rate codewords, the full-spatial-rate codebook having been designed by:
   selecting an underlying partial-spatial-rate codebook designed for a T-transmit antenna system configured for partial-spatial-rate coding data over $N_2$ spatial streams such that $N_2 < T$; and
   designing the full-spatial-rate codebook based upon the underlying partial-spatial-rate codebook, designing the full-spatial-rate codebook including defining the full-spatial-rate codewords based upon partial-spatial-rate codewords of the partial-spatial rate codebook and basis vectors of a null space of the respective partial-spatial-rate codewords in a multi-dimensional vector space.

15. An apparatus according to claim 14, wherein providing a spatial-rate codebook comprises providing a full-spatial-rate codebook having been designed by:
   selecting an underlying partial-spatial-rate codebook $\Pi(T, N_2) \triangleq \{P_1, \ldots P_L\}$ of size L, the partial-spatial-rate codebook including partial-spatial-rate codewords $P_1, \ldots P_L$; and
   designing the full-spatial rate codebook based upon the underlying partial-spatial-rate codebook as follows:

$$\Pi(T, N_1) \triangleq \left\{ \underbrace{[P_1, P_1^\perp], \ldots [P_L, P_L^\perp]}_{\tilde{P}_1 \qquad \tilde{P}_L} \right\} \square \{\tilde{P}_1, \ldots \tilde{P}_L\},$$

the full-spatial-rate codebook including full-spatial-rate codewords $\tilde{P}_1, \ldots \tilde{P}_L$, and wherein $P_l^\perp$ represents the basis vectors of the null space of partial-spatial-rate codeword $P_l$.

16. An apparatus according to claim 11, wherein selecting or receiving a selection of a plurality of spatial-rate codewords comprises receiving a selection of a plurality of spatial-rate codewords, and wherein execution of the executable instructions by the processor further causes the apparatus to perform the following:
   receiving a stream of a plurality of pieces of data in a T-transmit antenna system, the pieces of data having been spatial-rate coded; and
   weighting the pieces of data coded over the carriers with the received selection of full-spatial-rate codewords.

17. An apparatus according to claim 11, wherein selecting or receiving a selection of a plurality of spatial-rate codewords comprises selecting a plurality of spatial-rate codewords such that a stream of a plurality of pieces of data in the T-transmit antenna system is capable of being weighted by the selected spatial-rate codewords.

18. An apparatus according to claim 17, wherein providing a spatial-rate-codebook comprises providing a full-spatial-rate codebook in a T-transmit antenna system configured for full-spatial-rate coding data over $N_1$ spatial streams such that $N_1 = T$, the full-spatial-rate codebook comprising a plurality of full-spatial-rate codewords, and
   wherein selecting or receiving a selection of a plurality of spatial-rate codewords comprises, for each of the full-spatial-rate codewords, selecting a partial-spatial-rate codeword from the underlying partial-spatial-rate codebook by minimizing a distance between a partial-spatial-rate codeword and a matrix identified from a singular value decomposition of a wireless channel matrix, and thereafter selecting a full-spatial-rate codeword based upon the selected partial-spatial-rate codeword.

19. An apparatus according to claim 17, wherein selecting or receiving a selection of a plurality of spatial-rate codewords comprises, for each of the spatial-rate codewords, selecting a f-spatial-rate codeword by maximizing a minimum signal-to-noise ratio (SNR) across at least a portion of N spatial streams over at least a portion of R carriers at an output of the apparatus, the minimum SNR being based upon a spatial-rate codeword.

20. An apparatus according to claim 17, wherein selecting or receiving a selection of a plurality of spatial-rate codewords comprises, for each of the spatial-rate codewords, selecting a spatial-rate codeword by minimizing a maximum error across at least a portion of N spatial streams over at least a portion of R carriers at an output of the apparatus, the error being based upon a spatial-rate codeword.

21. A method comprising:
providing a full-spatial-rate codebook in a T-transmit antenna system configured for full-spatial-rate coding data over $N_1$ spatial streams such that $N_1=T$, the full-spatial-rate codebook comprising a plurality of full-spatial-rate codewords, the full-spatial-rate codebook having been designed by:
selecting an underlying partial-spatial-rate codebook designed for a T-transmit antenna system configured for partial-spatial-rate coding data over $N_2$ spatial streams such that $N_2<T$; and
designing the full-spatial-rate codebook based upon the underlying partial-spatial-rate codebook, designing the full-spatial-rate codebook including defining the full-spatial-rate codewords based upon partial-spatial-rate codewords of the partial-spatial rate codebook and basis vectors of a null space of the respective partial-spatial-rate codewords in a multi-dimensional vector space,
wherein providing a full-spatial-rate codebook comprises providing a full-spatial-rate codebook such that a stream of at least one piece of data in a T-transmit antenna system is capable of being weighted by the full-spatial-rate codewords of the full-spatial-rate codebook.

22. A method according to claim 21, wherein providing a full-spatial-rate codebook comprises providing a full-spatial-rate codebook having been designed by:
selecting an underlying partial-spatial-rate codebook $\Pi(T, N_2) \triangleq \{P_1, \ldots P_L\}$ of size L, the partial-spatial-rate codebook including partial-spatial-rate codewords $P_1, \ldots P_L$; and
designing the full-spatial rate codebook based upon the underlying partial-spatial-rate codebook as follows:

$$\Pi(T, N_1) \triangleq \left\{ \underbrace{[P_1, P_1^\perp], \ldots [P_L, P_L^\perp]}_{\tilde{P}_1 \qquad\qquad \tilde{P}_L} \right\} \square \{\tilde{P}_1, \ldots \tilde{P}_L\},$$

the full-spatial-rate codebook including full-spatial-rate codewords $\tilde{P}_1, \ldots \tilde{P}_L$, and wherein $P_l^\perp$ represents the basis vectors of the null space of partial-spatial-rate codeword $P_l$.

23. A method according to claim 21 further comprising:
receiving a stream of at least one piece of data in a T-transmit antenna system, the at least one piece of data having been full-spatial-rate coded; and
weighting at least one of the pieces of data coded over at least one carrier with at least one full-spatial-rate codeword of the full-spatial-rate codebook.

24. A method according to claim 21 further comprising:
selecting at least one full-spatial-rate codeword from the full-spatial-rate codebook such that a stream of at least one piece of data in a T-transmit antenna system is capable of being weighted by the selected full-spatial-rate codeword.

25. A method according to claim 24, wherein selecting at least one full-spatial-rate codeword comprises, for each of the at least one full-spatial-rate codewords:
selecting a partial-spatial-rate codeword from the underlying partial-spatial-rate codebook by minimizing a distance between a partial-spatial-rate codeword and a matrix identified from a singular value decomposition of a wireless channel matrix; and selecting a full-spatial-rate codeword based upon the selected partial-spatial-rate codeword.

26. A method according to claim 24, wherein selecting at least one full-spatial-rate codeword comprises, for each of the at least one full-spatial-rate codewords:
selecting, at a receiving apparatus, a full-spatial-rate codeword by maximizing a minimum signal-to-noise ratio (SNR) across at least a portion of $N_1$ spatial streams over at least a portion of R carriers at an output of the receiving apparatus, the minimum SNR being based upon a full-spatial-rate codeword.

27. A method according to claim 24, wherein selecting at least one full-spatial-rate codeword comprises, for each of the at least one full-spatial-rate codeword:
selecting, at a receiving apparatus, a full-spatial-rate codeword by minimizing a maximum error across at least a portion of $N_1$ spatial streams over at least a portion of R carriers at an output of the receiving apparatus, the error being based upon a full-spatial-rate codeword.

28. A method according to claim 24, wherein selecting at least one full-spatial-rate codeword comprises, for a plurality of full-spatial-rate codewords:
selecting a given full-spatial-rate codeword for data coded over a given carrier, the full-spatial-rate codeword being selected from a full-spatial-rate codebook of size L; and
selecting a next full-spatial-rate codeword for data coded over a next carrier, the next full-spatial-rate codeword being selected from a subset of the full-spatial-rate codebook, the subset being of size L'<L and selected based upon a distance from the given full-spatial-rate codeword in a collection of vector subspaces including the full-spatial-rate codewords.

29. A method according to claim 28, wherein selecting a given full-spatial-rate codeword comprises:
selecting a given partial-spatial-rate codeword from an underlying partial-spatial-rate codebook of size L by minimizing a distance between a partial-spatial-rate codeword and a matrix identified from a singular value decomposition of a wireless channel matrix; and
selecting a given full-spatial-rate codeword based upon the selected given partial-spatial-rate codeword.

30. A method according to claim 29, wherein selecting a next full-spatial-rate codeword comprises:
selecting a next partial-spatial-rate codeword from a subset of the underlying partial-spatial-rate codebook by minimizing a distance between a partial-spatial-rate codeword and a matrix identified from a singular value decomposition of a wireless channel matrix, the subset being of size L'<L and selected based upon a distance from the given partial-spatial-rate codeword in a collection of vector subspaces including the partial-spatial-rate codewords; and
selecting a next full-spatial-rate codeword based upon the selected next partial-spatial-rate codeword.

31. A method comprising:
providing a spatial-rate codebook in a T-transmit antenna system configured for spatial-rate coding data over N spatial streams, the spatial-rate codebook comprising a plurality of spatial-rate codewords; and
selecting or receiving a selection of a plurality of spatial-rate codewords from the spatial-rate codebook such that a stream of at least one piece of data in the T-transmit antenna system is capable of being weighted by the selected spatial-rate codewords, the plurality of spatial-rate codewords being selected by:

selecting a given spatial-rate codeword for data coded over a given carrier, the spatial-rate codeword being selected from a spatial-rate codebook of size L; and selecting a next spatial-rate codeword for data coded over a next carrier, the next spatial-rate codeword being selected from a subset of the spatial-rate codebook, the subset being of size L'<L and selected based upon a distance from the given spatial-rate codeword in a collection of vector subspaces including the spatial-rate codewords.

32. A method according to claim 31, wherein providing a spatial-rate codebook comprises providing a full-spatial-rate codebook in a T-transmit antenna system configured for full-spatial-rate coding data over $N_1$ spatial streams such that $N_1=T$, the full-spatial-rate codebook comprising a plurality of full-spatial-rate codewords, and wherein the full-spatial-rate codeword is selected by:

selecting a given partial-spatial-rate codeword from an underlying partial-spatial-rate codebook of size L by minimizing a distance between a partial-spatial-rate codeword and a matrix identified from a singular value decomposition of a wireless channel matrix; and selecting a given full-spatial-rate codeword based upon the selected given partial-spatial-rate codeword.

33. A method according to claim 32, wherein the next full-spatial-rate codeword is selected by:

selecting a next partial-spatial-rate codeword from a subset of the underlying partial-spatial-rate codebook by minimizing a distance between a partial-spatial-rate codeword and a matrix identified from a singular value decomposition of a wireless channel matrix, the subset being of size L'<L and selected based upon a distance from the given partial-spatial-rate codeword in a collection of vector subspaces including the partial-spatial-rate codewords; and selecting a next full-spatial-rate codeword based upon the selected next partial-spatial-rate codeword.

34. A method according to claim 31, wherein providing a spatial-rate codebook comprises providing a full-spatial-rate codebook in a T-transmit antenna system configured for full-spatial-rate coding data over $N_1$ spatial streams such that $N_1=T$, the full-spatial-rate codebook comprising a plurality of full-spatial-rate codewords, the full-spatial-rate codebook having been designed by:

selecting an underlying partial-spatial-rate codebook designed for a T-transmit antenna system configured for partial-spatial-rate coding data over $N_2$ spatial streams such that $N_2<T$; and designing the full-spatial-rate codebook based upon the underlying partial-spatial-rate codebook, designing the full-spatial-rate codebook including defining the full-spatial-rate codewords based upon partial-spatial-rate codewords of the partial-spatial rate codebook and basis vectors of a null space of the respective partial-spatial-rate codewords in a multi-dimensional vector space.

35. A method according to claim 34, wherein providing a spatial-rate codebook comprises providing a full-spatial-rate codebook having been designed by:

selecting an underlying partial-spatial-rate codebook $\Pi(T, N_2) \triangleq \{P_1, \ldots P_L\}$ of size L, the partial-spatial-rate codebook including partial-spatial-rate codewords $P_1, \ldots P_L$; and designing the full-spatial rate codebook based upon the underlying partial-spatial-rate codebook as follows:

$$\Pi(T, N_1) \triangleq \left\{ \underbrace{[P_1, P_1^\perp]}_{\tilde{P}_1}, \ldots \underbrace{[P_L, P_L^\perp]}_{\tilde{P}_L} \right\} \square \{\tilde{P}_1, \ldots \tilde{P}_L\},$$

the full-spatial-rate codebook including full-spatial-rate codewords $\tilde{P}_1, \ldots \tilde{P}_L$, and wherein $P_j^\perp$ represents the basis vectors of the null space of partial-spatial-rate codeword $P_j$.

36. A method according to claim 31, wherein selecting or receiving a selection of a plurality of spatial-rate codewords comprises receiving a selection of a plurality of spatial-rate codewords, and wherein the method further comprises:

receiving a stream of a plurality of pieces of data in a T-transmit antenna system, the pieces of data having been spatial-rate coded; and weighting the pieces of data coded over the carriers with the received selection of full-spatial-rate codewords.

37. A method according to claim 31, wherein selecting or receiving a selection of a plurality of spatial-rate codewords comprises selecting a plurality of spatial-rate codewords such that a stream of a plurality of pieces of data in the T-transmit antenna system is capable of being weighted by the selected spatial-rate codewords.

38. A method according to claim 37, wherein providing a spatial-rate codebook comprises providing a full-spatial-rate codebook in a T-transmit antenna system configured for full-spatial-rate coding data over $N_1$ spatial streams such that $N_1=T$, the full-spatial-rate codebook comprising a plurality of full-spatial-rate codewords, and wherein selecting or receiving a selection of a plurality of spatial-rate codewords comprises, for each of the full-spatial-rate codewords, selecting a partial-spatial-rate codeword from the underlying partial-spatial-rate codebook by minimizing a distance between a partial-spatial-rate codeword and a matrix identified from a singular value decomposition of a wireless channel matrix, and thereafter selecting a full-spatial-rate codeword based upon the selected partial-spatial-rate codeword.

39. A method according to claim 37, wherein selecting or receiving a selection of a plurality of spatial-rate codewords comprises, for each of the spatial-rate codewords, selecting a f-spatial-rate codeword by maximizing a minimum signal-to-noise ratio (SNR) across at least a portion of N spatial streams over at least a portion of R carriers at an output of the receiving apparatus, the minimum SNR being based upon a spatial-rate codeword.

40. A method according to claim 37, wherein selecting or receiving a selection of a plurality of spatial-rate codewords comprises, for each of the spatial-rate codewords, selecting a spatial-rate codeword by minimizing a maximum error across at least a portion of N spatial streams over at least a portion of R carriers at an output of the receiving apparatus, the error being based upon a spatial-rate codeword.

41. A computer program product comprising at least one computer-readable storage medium having computer-readable program code portions stored therein, that in response to execution by a processor cause an apparatus to at least perform the following:

providing a full-spatial-rate codebook in a T-transmit antenna system configured for full-spatial-rate coding data over $N_1$ spatial streams such that $N_1=T$, the full-spatial-rate codebook comprising a plurality of full-spatial-rate codewords, the full-spatial-rate codebook having been designed by:

selecting an underlying partial-spatial-rate codebook designed for a T-transmit antenna system configured for partial-spatial-rate coding data over $N_2$ spatial streams such that $N_2<T$; and designing the full-spatial-rate codebook based upon the underlying partial-spatial-rate codebook, designing the full-spatial-rate codebook including defining the full-spatial-rate codewords based upon partial-spatial-rate codewords of the partial-spatial rate codebook and basis vectors of a null space of the respective partial-spatial-rate codewords in a multi-dimensional vector space, wherein providing a full-spatial-rate codebook comprises providing a full-spatial-rate codebook such that a stream of at least one piece of data in a T-transmit antenna system is capable of being weighted by the full-spatial-rate codewords of the full-spatial-rate codebook.

42. A computer program product according to claim 41, wherein providing a full-spatial-rate codebook comprises providing a full-spatial-rate codebook having been designed by:

selecting an underlying partial-spatial-rate codebook $\Pi(T, N_2) \triangleq \{P_1, \ldots P_L\}$ of size L, the partial-spatial-rate codebook including partial-spatial-rate codewords $P_1, \ldots P_L$; and designing the full-spatial rate codebook based upon the underlying partial-spatial-rate codebook as follows:

$$\Pi(T, N_1) \triangleq \left\{ \underbrace{[P_1, P_1^\perp], \ldots [P_L, P_L^\perp]}_{\tilde{P}_1 \quad \tilde{P}_L} \right\} \square \{\tilde{P}_1, \ldots \tilde{P}_L\},$$

the full-spatial-rate codebook including full-spatial-rate codewords $\tilde{P}_1, \ldots \tilde{P}_L$, and wherein $P_l^\perp$ represents the basis vectors of the null space of partial-spatial-rate codeword $P_l$.

43. A computer program product according to claim 41, wherein execution of the computer-readable program code portions by the processor further causes the apparatus to perform:

receiving a stream of at least one piece of data in a T-transmit antenna system, the at least one piece of data having been full-spatial-rate coded; and weighting at least one of the pieces of data coded over at least one carrier with at least one full-spatial-rate codeword of the full-spatial-rate codebook.

44. A computer program product according to claim 41, wherein execution of the computer-readable program code portions by the processor further causes the apparatus to perform:

selecting at least one full-spatial-rate codeword from the full-spatial-rate codebook such that a stream of at least one piece of data in a T-transmit antenna system is capable of being weighted by the selected full-spatial-rate codeword.

45. A computer program product according to claim 44, wherein selecting at least one full-spatial-rate codeword comprises, for each of the at least one full-spatial-rate codewords:

selecting a partial-spatial-rate codeword from the underlying partial-spatial-rate codebook by minimizing a distance between a partial-spatial-rate codeword and a matrix identified from a singular value decomposition of a wireless channel matrix; and selecting a full-spatial-rate codeword based upon the selected partial-spatial-rate codeword.

46. A computer program product according to claim 44, wherein selecting at least one full-spatial-rate codeword comprises, for each of the at least one full-spatial-rate codewords:

selecting, a full-spatial-rate codeword by maximizing a minimum signal-to-noise ratio (SNR) across at least a portion of $N_1$ spatial streams over at least a portion of R carriers at an output of the apparatus, the minimum SNR being based upon a full-spatial-rate codeword.

47. A computer program product according to claim 44, wherein selecting at least one full-spatial-rate codeword comprises, for each of the at least one full-spatial-rate codewords:

selecting, a full-spatial-rate codeword by minimizing a maximum error across at least a portion of $N_1$ spatial streams over at least a portion of R carriers at an output of the apparatus, the error being based upon a full-spatial-rate codeword.

48. A computer program product according to claim 44, wherein selecting at least one full-spatial-rate codeword comprises, for a plurality of full-spatial-rate codewords:

selecting a given full-spatial-rate codeword for data coded over a given carrier, the full-spatial-rate codeword being selected from a full-spatial-rate codebook of size L; and selecting a next full-spatial-rate codeword for data coded over a next carrier, the next full-spatial-rate codeword being selected from a subset of the full-spatial-rate codebook, the subset being of size L'<L and selected based upon a distance from the given full-spatial-rate codeword in a collection of vector subspaces including the full-spatial-rate codewords.

49. A computer program product according to claim 48, wherein selecting a given full-spatial-rate codeword comprises:

selecting a given partial-spatial-rate codeword from an underlying partial-spatial-rate codebook of size L by minimizing a distance between a partial-spatial-rate codeword and a matrix identified from a singular value decomposition of a wireless channel matrix; and selecting a given full-spatial-rate codeword based upon the selected given partial-spatial-rate codeword.

50. A computer program product according to claim 49, wherein selecting a next full-spatial-rate codeword comprises:

selecting a next partial-spatial-rate codeword from a subset of the underlying partial-spatial-rate codebook by minimizing a distance between a partial-spatial-rate codeword and a matrix identified from a singular value decomposition of a wireless channel matrix, the subset being of size L'<L and selected based upon a distance from the given partial-spatial-rate codeword in a collection of vector subspaces including the partial-spatial-rate codewords; and selecting a next full-spatial-rate codeword based upon the selected next partial-spatial-rate codeword.

51. A computer program product comprising at least one computer-readable storage medium having computer-readable program code portions stored therein that in response to execution by a processor cause an apparatus to at least perform the following:

providing a spatial-rate codebook in a T-transmit antenna system configured for spatial-rate coding data over N spatial streams, the spatial-rate codebook comprising a plurality of spatial-rate codewords; and selecting or receiving a selection of a plurality of spatial-rate codewords from the spatial-rate codebook such that a stream of at least one piece of data in the T-transmit antenna system is capable of being weighted by the selected spatial-rate codewords, the plurality of spatial-rate codewords being selected by:
  selecting a given spatial-rate codeword for data coded over a given carrier, the spatial-rate codeword being selected from a full-spatial-rate codebook of size L; and
  selecting a next spatial-rate codeword for data coded over a next carrier, the next spatial-rate codeword being selected from a subset of the spatial-rate codebook, the subset being of size L'<L and selected based upon a distance from the given spatial-rate codeword in a collection of vector subspaces including the spatial-rate codewords.

52. A computer program product according to claim 51, wherein providing a spatial-rate codebook comprises providing a full-spatial-rate codebook in a T-transmit antenna system configured for full-spatial-rate coding data over $N_1$ spatial streams such that $N_1=T$, the full-spatial-rate codebook comprising a plurality of full-spatial-rate codewords, and
  wherein the full-spatial-rate codeword is selected by:
    selecting a given partial-spatial-rate codeword from an underlying partial-spatial-rate codebook of size L by minimizing a distance between a partial-spatial-rate codeword and a matrix identified from a singular value decomposition of a wireless channel matrix; and
    selecting a given full-spatial-rate codeword based upon the selected given partial-spatial-rate codeword.

53. A computer program product according to claim 52, wherein the next full-spatial-rate codeword is selected by:
  selecting a next partial-spatial-rate codeword from a subset of the underlying partial-spatial-rate codebook by minimizing a distance between a partial-spatial-rate codeword and a matrix identified from a singular value decomposition of a wireless channel matrix, the subset being of size L'<L and selected based upon a distance from the given partial-spatial-rate codeword in a collection of vector subspaces including the partial-spatial-rate codewords; and
  selecting a next full-spatial-rate codeword based upon the selected next partial-spatial-rate codeword.

54. A computer program product according to claim 51, wherein providing a spatial-rate codebook comprises providing a full-spatial-rate codebook in a T-transmit antenna system configured for full-spatial-rate coding data over $N_1$ spatial streams such that $N_1=T$, the full-spatial-rate codebook comprising a plurality of full-spatial-rate codewords, the full-spatial-rate codebook having been designed by:
  selecting an underlying partial-spatial-rate codebook designed for a T-transmit antenna system configured for partial-spatial-rate coding data over $N_2$ spatial streams such that $N_2<T$; and
  designing the full-spatial-rate codebook based upon the underlying partial-spatial-rate codebook, designing the full-spatial-rate codebook including defining the full-spatial-rate codewords based upon partial-spatial-rate codewords of the partial-spatial rate codebook and basis vectors of a null space of the respective partial-spatial-rate codewords in a multi-dimensional vector space.

55. A computer program product according to claim 54, wherein providing a spatial-rate codebook comprises providing a full-spatial-rate codebook having been designed by:
  selecting an underlying partial-spatial-rate codebook $\Pi(T, N_2) \triangleq \{P_1, \ldots P_L\}$ of size L, the partial-spatial-rate codebook including partial-spatial-rate codewords $P_1, \ldots P_L$; and
  designing the full-spatial rate codebook based upon the underlying partial-spatial-rate codebook as follows:

$$\Pi(T, N_1) \triangleq \left\{ \underbrace{[P_1, P_1^\perp]}_{\tilde{P}_1}, \ldots \underbrace{[P_L, P_L^\perp]}_{\tilde{P}_L} \right\} \square \{\tilde{P}_1, \ldots \tilde{P}_L\},$$

the full-spatial-rate codebook including full-spatial-rate codewords $\tilde{P}_1, \ldots \tilde{P}_L$, and wherein $P_l^\perp$ represents the basis vectors of the null space of partial-spatial-rate codeword $P_l$.

56. A computer program product according to claim 51, wherein selecting or receiving a selection of a plurality of spatial-rate codewords comprises receiving a selection of a plurality of spatial-rate codewords, and wherein execution of the computer-readable program code portions by the processor further causes the apparatus to perform:
  receiving a stream of a plurality of pieces of data in a T-transmit antenna system, the pieces of data having been spatial-rate coded; and
  weighting the pieces of data coded over the carriers with the received selection of spatial-rate codewords.

57. A computer program product according to claim 51, wherein selecting or receiving a selection of a plurality of spatial-rate codewords comprises selecting a plurality of spatial-rate codewords such that a stream of a plurality of pieces of data in the T-transmit antenna system is capable of being weighted by the selected spatial-rate codewords.

58. A computer program product according to claim 57, wherein providing a spatial-rate codebook comprises providing a full-spatial-rate codebook in a T-transmit antenna system configured for full-spatial-rate coding data over $N_1$ spatial streams such that $N_1=T$, the full-spatial-rate codebook comprising a plurality of full-spatial-rate codewords, and
  wherein selecting or receiving a selection of a plurality of spatial-rate codewords comprises, for each of the full-spatial-rate codewords, selecting a partial-spatial-rate codeword from the underlying partial-spatial-rate codebook by minimizing a distance between a partial-spatial-rate codeword and a matrix identified from a singular value decomposition of a wireless channel matrix, and thereafter selecting a full-spatial-rate codeword based upon the selected partial-spatial-rate codeword.

59. A computer program product according to claim 57, wherein selecting or receiving a selection of a plurality of spatial-rate codewords comprises, for each of the spatial-rate codewords, selecting a spatial-rate codeword by maximizing a minimum signal-to-noise ratio (SNR) across at least a portion of N spatial streams over at least a portion of R carriers at an output of the apparatus, the minimum SNR being based upon a spatial-rate codeword.

60. A computer program product according to claim 57, wherein selecting or receiving a selection of a plurality of spatial-rate codewords comprises, for each of the spatial-rate codewords, selecting a spatial-rate codeword by minimizing a maximum error across at least a portion of N spatial streams over at least a portion of R carriers at an output of the apparatus, the error being based upon a full-spatial-rate codeword.

* * * * *

UNITED STATES PATENT AND TRADEMARK OFFICE
CERTIFICATE OF CORRECTION

| | | |
|---|---|---|
| PATENT NO. | : 7,813,458 B2 | Page 1 of 1 |
| APPLICATION NO. | : 11/573940 | |
| DATED | : October 12, 2010 | |
| INVENTOR(S) | : van Waes et al. | |

It is certified that error appears in the above-identified patent and that said Letters Patent is hereby corrected as shown below:

Column 1,
Lines 10 and 63, "preceding", each occurrence, should read --precoding--.

Column 2,
Line 66, "preceding" should read --precoding--.

Column 12,
Lines 46 and 58, "preceding", each occurrence, should read --precoding--.

Column 14,
Lines 1 and 2, "preceding" should read --precoding--.

Column 15,
Lines 4, 5, 12, 17, 27, 33 and 46, "preceding", each occurrence, should read --precoding--.

Column 18,
Lines 33 and 45, cancel "by".

Signed and Sealed this
Twenty-fourth Day of January, 2012

David J. Kappos
*Director of the United States Patent and Trademark Office*